(12) United States Patent
Honda et al.

(10) Patent No.: US 6,282,378 B1
(45) Date of Patent: *Aug. 28, 2001

(54) VARIABLE FOCAL LENGTH LENS UNIT

(75) Inventors: Yuichi Honda; Satoshi Nakamoto; Haruki Nakayama, all of Hachioji (JP)

(73) Assignee: Konica Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/557,829

(22) Filed: Nov. 14, 1995

(30) Foreign Application Priority Data

Nov. 17, 1994 (JP) .................................. 6-283702

(51) Int. Cl.⁷ .................................................. G03B 17/00
(52) U.S. Cl. ................................. 396/79; 396/87; 359/689
(58) Field of Search ........................... 354/195.1, 195.12; 359/684, 689; 396/72, 77, 79, 82, 85–87

(56) References Cited

U.S. PATENT DOCUMENTS

| | | | |
|---|---|---|---|
| 4,842,385 | * 6/1989 | Tanaka | 359/684 |
| 4,854,682 | * 8/1989 | Yamanashi | 359/689 |
| 5,069,536 | * 12/1991 | Ogata | 359/689 |
| 5,136,431 | * 8/1992 | Terasawa et al. | 359/684 |
| 5,450,242 | * 9/1995 | Kohmoto et al. | 354/195.12 |
| 5,486,894 | * 1/1996 | Fujibayashi | 354/195.11 |

\* cited by examiner

Primary Examiner—David M. Gray
(74) Attorney, Agent, or Firm—Finnegan, Henderdon, Farabow, Garrett, & Dunner, L.L.P.

(57) ABSTRACT

A variable focal length lens unit, including: the first, the second, and the third lens components which are aligned on the optical axis; the first, the second, and the third guiding members for respectively guiding movements of the first, the second, and the third lens components; a moving mechanism for independently moving the first, the second, and the third lens components in the direction of the optical axis so as to focus the variable focal length lens unit onto an object and zoom the variable focal length lens unit. In the lens unit, all of the first, the second, and the third lens components move in all ranges of the focal lengths, and at least one of the first, the second, and the third lens components moves in the direction by a distance being different from moving distances of other lens components when the variable focal length lens unit is focused onto the object and the variable focal length lens unit is zoomed.

22 Claims, 8 Drawing Sheets

VARIABLE FOCAL LENGTH LENS UNIT

BACKGROUND OF THE INVENTION

The present invention relates to a variable focal length lens used as a picture-taking lens of a camera. Concerning a variable focal length lens such as a conventional zoom lens and also concerning a single focal length lens, the following focusing systems are adopted.

The first focusing system is described below. In the first focusing system, only a specific lens component is moved so that focusing operation can be conducted from the infinite to a short distance. This example is shown in FIG. 1. When zooming is conducted in a range from W (short focal length) to T (long focal length), both the front component lens FC and the rear component lens RC are moved. In this case, focusing is conducted at a predetermined focal length in such a manner that only the front component lens FC is protruded in the arrowed direction in FIG. 1. In this connection, reference character F represents a photographic film.

According to the above system, a distance of the movement of the lens component is short. As a result, dimensions of the mechanism to move the lens barrel are small. Due to the above advantages, this system is most commonly used for the zoom lens at present.

The second focusing system is described below. In the second focusing system, the entire lens components are moved so that focusing can be conducted in a range from the infinite to a short distance. This system is shown in FIG. 2. In this system, in the case of focusing, both the front component lens FC and the rear component lens RC are protruded while leaving a predetermined interval between them. Due to the foregoing structure, this system is advantageous in that the lens performance is not deteriorated in the process of focusing, that is, the occurrence of aberration can be avoided.

In this system, the lens components are protruded while leaving a predetermined interval between them. Accordingly, the lens performance is not deteriorated in the process of focusing. Therefore, this system is mainly used for a single focal length lens.

However, the following problems may be encountered in these two conventional systems.

In order to downsize a camera, it is necessary to reduce the overall length of the lens components. Accordingly, in the first system, when the zoom lens is downsized, it is necessary to conduct focusing in accordance with a change in the object distance, and it is required to move a specific lens component by a very short distance. As a matter of fact, when a distance of the movement of the lens component is very small, it is difficult to adjust a position of the lens component with high accuracy. In general, the focal depth of a zoom lens is small on the telescopic side. Accordingly, the number of positions at which the specific lens component must be stopped for focusing is increased. For the reasons described above, it is difficult to downsize the lens unit. On the other hand, as compared with the second system described above, the lens performance is deteriorated on the wide angle side of a zoom lens in the first system, that is, aberration tends to occur on the wide angle side of a zoom lens.

In the second system, the following problems may be encountered. The longer the focal length is increased, the longer the distance of movement of the lens component for focusing is increased. Further, when focusing is conducted, the focal length is greatly changed.

In any variable focal length lenses of the prior art, it is difficult to realize a mechanism with high accuracy by which lens components A and B are integrally moved in the optical axis direction in one region, and in the other region, lens components A and B are respectively independently moved.

For example, even if the cams to move the lens components A and B are respectively set up so that the above conditions can be satisfied and the cams have the same inclination in a specific region, it is impossible to move the lens components A and B completely integrally with each other. Therefore, it is difficult to ensure the accuracy. In the case where a helicoid is used, it is impossible to realize the above mechanism by this method.

In the variable focal length lens of the prior art, it is impossible to realize the following mechanism. That is, when one lens component B is moved in the direction of the optical axis, the other lens component A is released from the drive means of its own such as a cam and helicoid, so that the lens component A can be moved together with the lens component B.

The present invention has been accomplished to solve the above technical problems caused when the variable focal length lens is downsized.

SUMMARY OF THE INVENTION

The first object of the present invention is to provide a variable focal length lens characterized in that: a distance of movement of a specific lens component in the optical axis direction is reduced in the process of focusing without deteriorating the mechanical accuracy; and the lens performance is not deteriorated even on the wide angle side, that is, the occurrence of aberration can be avoided even on the wide angle side. The second object of the present invention is to provide a variable focal length lens having a mechanism characterized in that: at least two lens components are integrally moved together in the optical axis direction in one region; and they are individually moved in the other region.

The above objects can be accomplished by one of the following means (1) to (4).

(1) The present invention is to provide a variable focal length lens, the focal length of which is changed when a plurality of lens components are independently moved in the direction of an optical axis. The variable focal length lens comprises: a first lens component arranged on the side closest to the object, the first lens contributing to focusing; a third lens component arranged on the side closest to the image, the third lens contributing to focusing; a second lens component arranged between the first and third lens component, the second lens contributing to focusing; and a focusing means for moving the above 3 lens components in the optical axis direction so that at least one of the above 3 lens components can be moved in the optical axis direction by a distance which is different from moving distances of other two lens components.

(2) The present invention is to provide a variable focal length lens having a plurality of lens components. The variable focal length lens comprises: a first lens component arranged on the side closest to the object, the first lens contributing to focusing; and a second lens component arranged on the side closest to the image, the second lens component contributing to focusing. When at least the shortest focal length is selected, focusing is conducted by moving the first and the second lens component on the optical axis by the same distance. When at least the longest focal length is selected, focusing is conducted by moving the first and the second lens component on the optical axis by different distances.

The present invention is to provide a variable focal length lens having a plurality of lens components. The variable focal length lens comprises: a first lens component arranged on the side closest to the object, the first lens contributing to focusing; a third lens component arranged on the side closest to the image, the third lens contributing to focusing; and a second lens component arranged between the first and third lens component, the second lens contributing to focusing. When at least the longest focal length is selected, the first and the third lens component are moved on the optical axis by the same distance and further the second lens component is moved on the optical axis by a different distance for focusing.

(4) The present invention is to provide a variable focal length lens. The variable focal length lens comprises: a first lens component, which contributes at least to the operation of focusing or zooming or alternatively contributes to both the operation of focusing and zooming, the first lens component having a protrusion of a predetermined length which protrudes onto the image side in the optical axis direction, the first lens component being capable of moving in the optical axis direction; a second lens component, which contributes at least to the operation of focusing or zooming or alternatively contributes to both the operation of focusing and zooming, the second lens component being disposed on the image side with respect to the first lens component, the second lens component having a collision member which comes into contact with the aforementioned protrusion at least when the shortest focal length is selected, the second lens component being capable of moving in the optical axis direction; a movement path for moving the first lens component in the optical axis direction; a regulating member for pushing the first lens component onto the image side in the movement path; and a first lens component holding means capable of moving in the optical axis direction, wherein the first and the second lens component are integrally moved in a body at least when the shortest focal length is selected.

In an aspect of the invention, moving means moves first, second, and third lens components along an optical axis to a first set of positions according to a desired focal length, and the moving means further moves the lens components along the optical axis from the first positions to a second set of positions according to an object distance in response to a release switch being pushed.

DETAILED DESCRIPTION OF THE INVENTION

Figure 1:
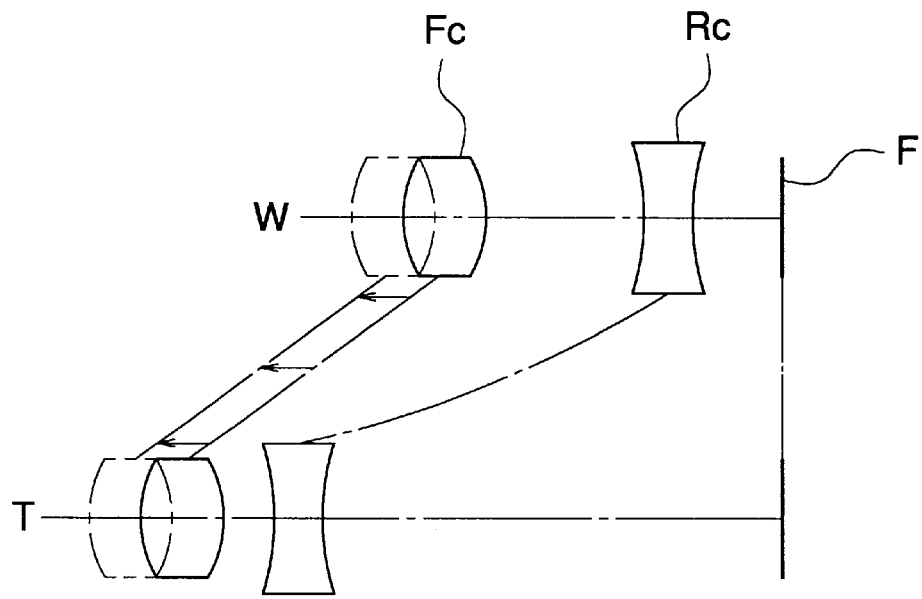
FIG. 1 is a schematic illustration of the first focusing system of a prior art.
Figure 2:
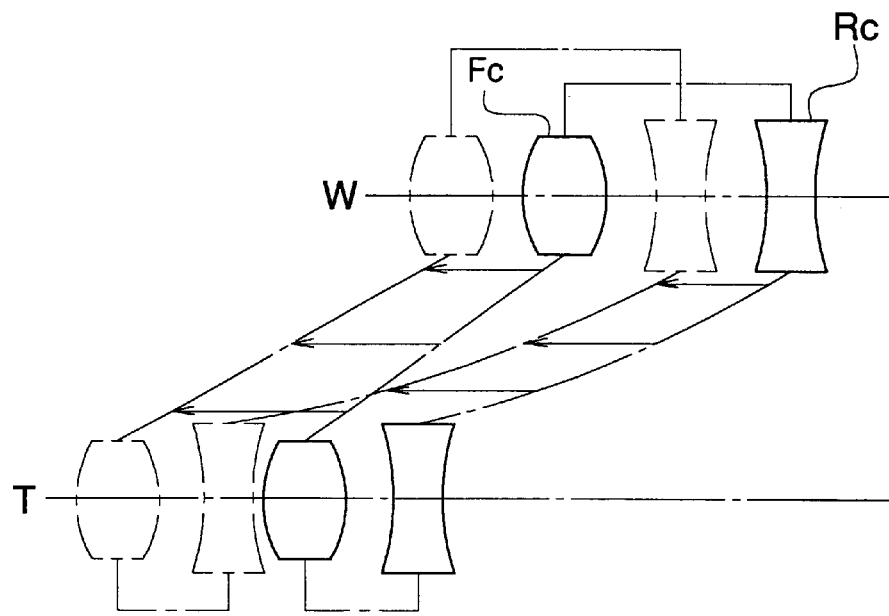
FIG. 2 is a schematic illustration of the second focusing system of a prior art.
Figure 3:
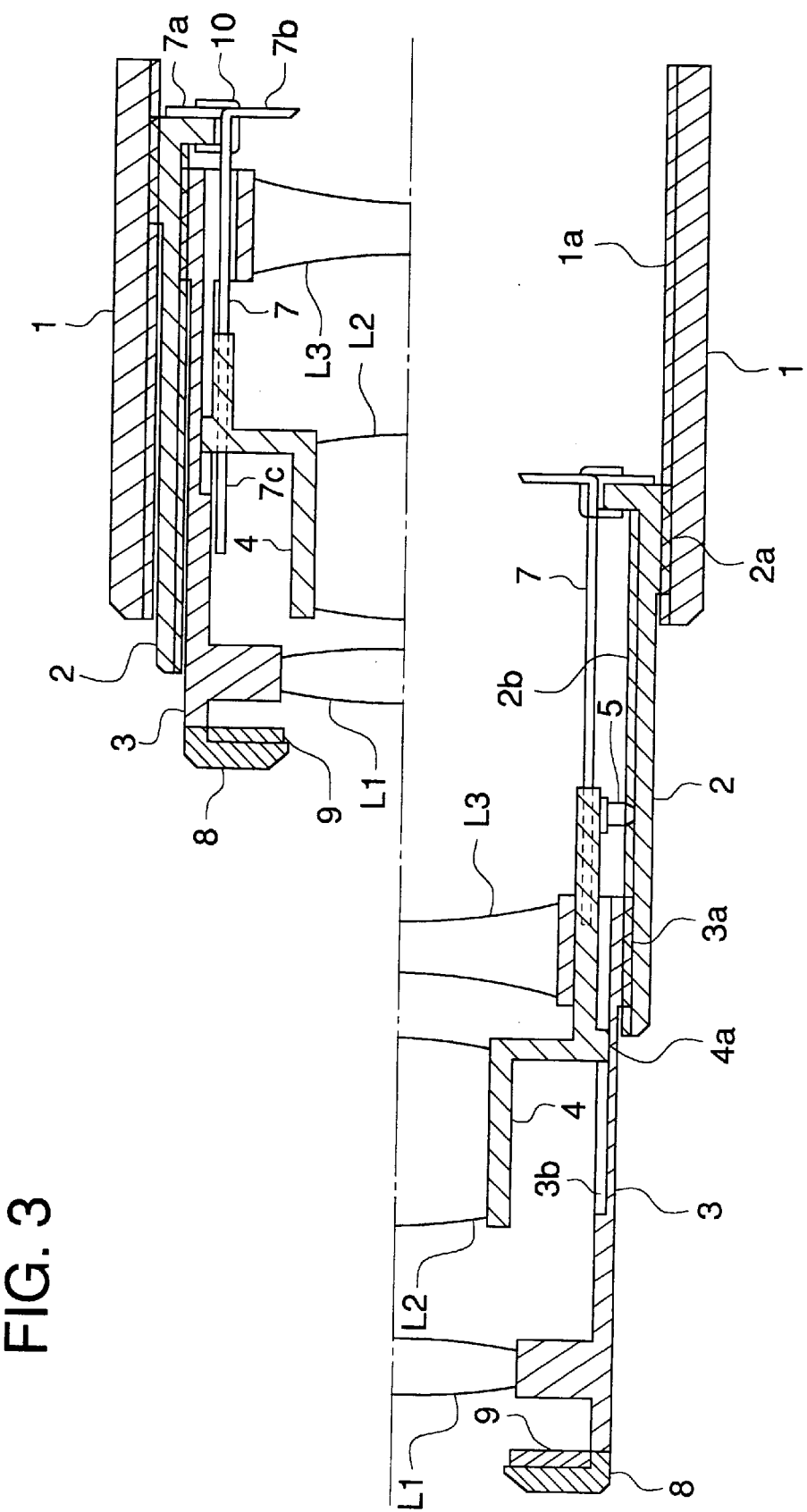
FIG. 3 is a cross-sectional view of the zoom lens barrel of the embodiment.

With reference to FIGS. 3 to 7, an embodiment of the present invention will be explained in detail. FIG. 3 is a longitudinally cross-sectional view of the zoom lens barrel, the zooming and the focusing operation of which can be conducted by the same drive source. In this drawing, the upper half with respect to the optical axis shows a condition in which the lens unit is set at a short focal length, and the lower half with respect to the optical axis shows a condition in which the lens unit is set at a long focal length.

Figure 4:
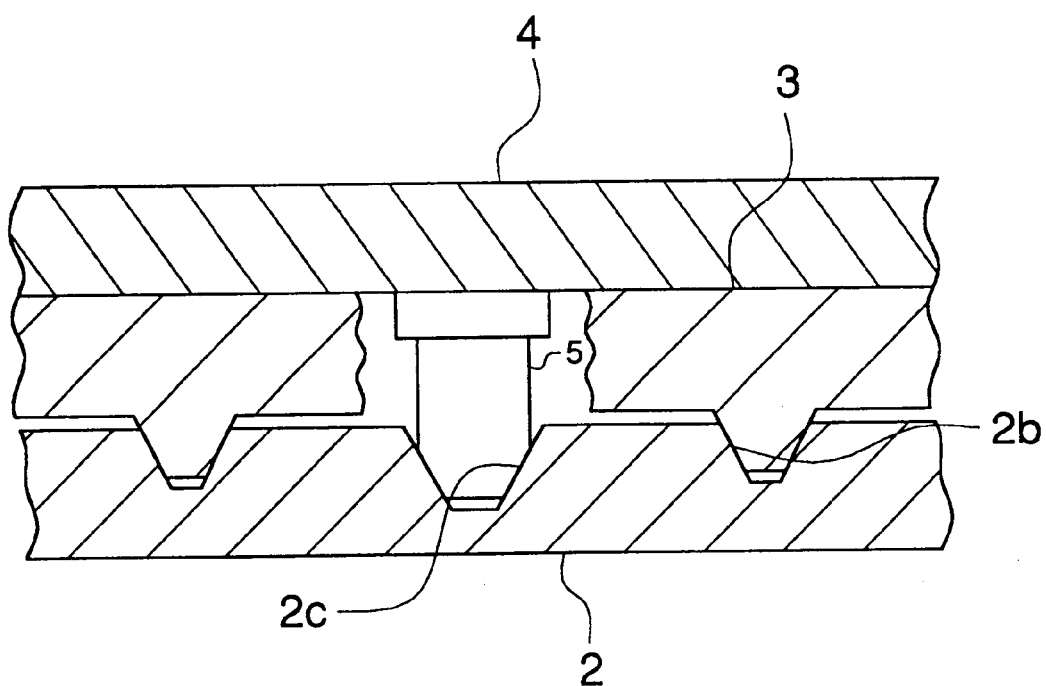
FIG. 4 is a cross-sectional view of the female helicoid and the cam.
Figure 5:
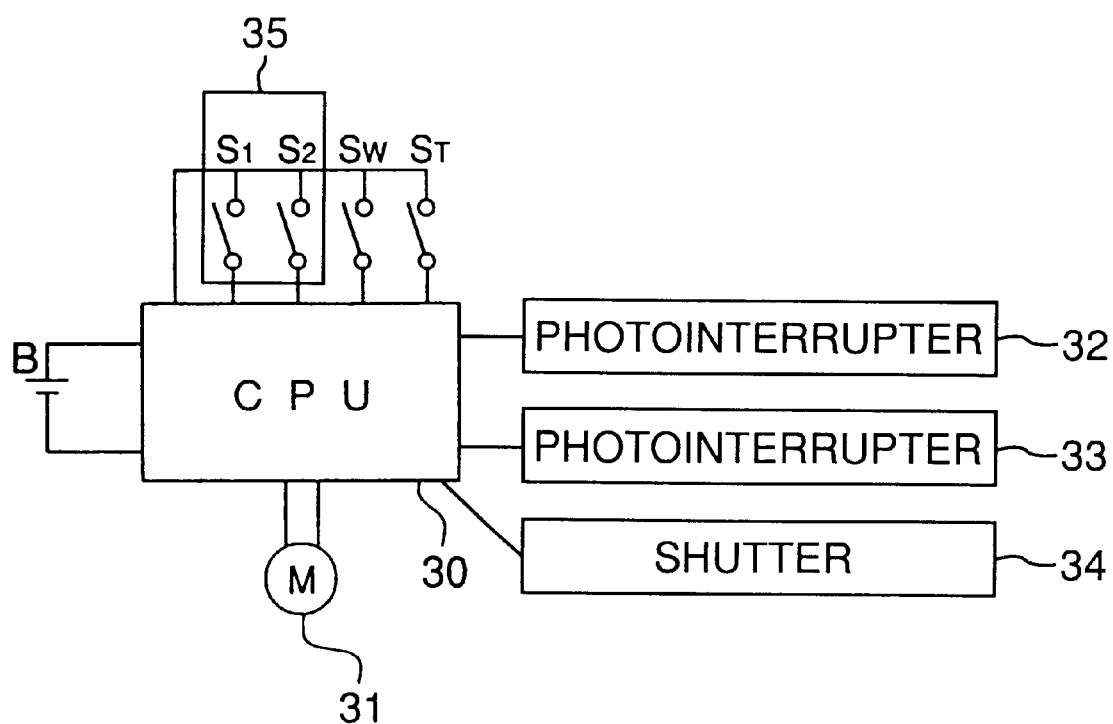
FIG. 5 is a block diagram of zooming and focusing.

In FIG. 3, reference numeral 1 is a fixed barrel which is integrally fixed to the camera body not shown in the drawing. On the inner circumference of the fixed barrel 1, there is formed a female helicoid 1a. Reference numeral 2 is a cam cylinder. On the outer circumference of the cam cylinder 2, there is formed a male helicoid 2a which engages with the female helicoid 1a, and there is formed a female helicoid 2b on the inner circumference of the cam cylinder 2. As illustrated in FIG. 4, there is formed a cam groove 2c in the female helicoid 2b. Reference numeral 3 is an inner cylinder, which holds the first positive lens component L1 and the third negative lens component L3 on the inner circumference. On the outer circumference of the inner cylinder 3, there is provided a male helicoid 3a which engages with the female helicoid 2b. Reference numeral 4 is the second lens holding frame. On the inner circumference, the second lens holding frame 4 holds the second positive lens component L2, and the outer circumference of the second lens holding frame 4 engages with the inner cylinder 3. Further, there is provided a cam pin 5 on the outer circumference of the second lens holding frame 4. The cam pin 5 is engaged with a cam groove 2c. In a range in which the cam pin 5 is moved in the optical axis direction, the inner cylinder is cut away and a long hole is formed on the inner cylinder.

Reference numeral 7 is a guide plate for guiding the lens component which moves straight. The cam cylinder 2 is rotatably held by the fixed cylinder 1 via the attachment member 10. At the rear end of the guide plate 7, there is formed a first bent portion 7a. A fore end of the first bent portion 7a is engaged with a long groove formed in the female helicoid 1a in parallel with the optical axis not shown in the drawing. When the cam cylinder 2 is rotated by a drive means not shown in the drawing, the cam cylinder 2 is moved in the optical axis direction along the female helicoid 1a. However, concerning the guide plate 7, since the long groove and the fore end of the first bent portion 7a are engaged with each other, while the guide plate 7 is not rotated, it is moved in the optical axis direction. In this case, the guide plate 7 is relatively rotated with respect to the cam cylinder 2. Further, the fore end portion 7c of the guide plate 7 is engaged with the long hole formed in the second lens holding frame 4, so that the rotation of the second lens holding frame 4 is obstructed.

The protrusion 4a provided on the outer circumference of the second lens holding frame 4 is engaged with the long groove 3b provided on the inner circumference of the inner cylinder 3. Accordingly, the rotation of the inner cylinder 3 is obstructed, so that the inner cylinder 3 is subjected to the rotation of the cam cylinder 2. Therefore, the inner cylinder 3 is moved straight in the optical axis direction.

The first bent portion 7b forms a fixed-diaphragm.

Reference numeral 8 is a decorative frame, and reference numeral 9 is a barrier.

The essential operation of the zoom lens barrel described above will be explained below.

Although not shown in the drawing, on the fixed barrel, there is provided a hole for driving the cam barrel 2. In the case of focusing, the rotation of a motor not shown in the drawing is transmitted to the cam cylinder 2 through the hole, so that the cam cylinder 2 can be driven. The cam cylinder 2 is engaged with the fixed barrel 1 in the manner of helicoid engagement. Accordingly, while the cam cylinder 2 is rotated, it is protruded out or protruded in, in the optical axis direction. At this time, the guide plate 7 rotatably holding the cam cylinder 2 moves only straight. When the cam cylinder 2 is rotated, since the rotation of the inner cylinder 3, which is in the helicoid engagement with the cam cylinder 2, is obstructed by the second lens holding frame 4, the inner cylinder 3 moves only straight. On the other hand, the second lens holding frame 4, which is engaged with the cam cylinder 2 in the manner of cam-engagement, individually moves straight in accordance with the shape of the cam groove 2c. Consequently, quantities of movement of the first lens component L1 and the third lens component L3 are respectively determined by the lead of the helicoid in which the fixed barrel 1 and the cam cylinder 2 are engaged with each other and also by the lead of the helicoid in which the cam cylinder 2 and the inner cylinder 3 are engaged with each other. A quantity of movement of the second lens component L2 is determined by the lead of the helicoid in which the fixed barrel 1 and the cam cylinder 2 are engaged with each other and also determined by the cam in which the cam cylinder 2 and the second lens holding frame 4 are engaged With reference to FIG. 5 which is a block diagram, the zooming and focusing operation will be explained as follows.

The zooming operation will be explained as follows. In this explanation, a case is taken for an example in which the focal length is varied from the position of W to the position of M1 illustrated in FIG. 6, the detail of which will be described later.

When the zooming button $S_T$ is pressed at the focal length W, a signal of the zooming button $S_T$ is inputted into CPU30. Then CPU30 outputs a command so that the lens barrel motor 31 can be normally rotated. By the rotation of the lens barrel motor 31, the first, second and third lens components are moved via the gear train. In order to detect a quantity of lens movement, the photo-interrupter 32 for zooming detects a quantity of rotation of the lens barrel motor 31. When a signal sent from the photo-interrupter 32 to CPU30 is changed, CPU30 outputs a command so that the lens barrel motor 31 is stopped. In this way, the first, the second and the third lens component are stopped at the positions of the focal length M1. In this way, the zooming operation is completed.

Next, the focusing operation will be explained below.

In the case of the focal length W, when the release button 35 is pressed and the switches S1 and S2 are turned on, range-finding information generated by an automatic focusing circuit (not shown) is inputted into CPU30. In accordance with the above range-finding information and the focal length determined by the above zooming operation, CPU30 sets a predetermined number of pulses according to the distance of movement to the focusing position. CPU30 outputs a command so that the lens barrel drive motor 31 is normally rotated. Therefore, the first, the second and the third lens component are driven by the motor 31 via a gear train. At the same time, a quantity of rotation of the lens barrel drive motor 31 is detected by the photo-interrupter 33. Pulses are inputted into CPU30 from the photo-interrupter 33, and the number of pulses is counted. When the number of counted pulses reaches the above predetermined value, the lens barrel drive motor 31 is stopped. In this way, the focusing operation is completed. After that, a shutter 34 is driven, and the film is exposed to light. After the completion of exposure to light, the lens barrel drive motor 31 is reversed until a predetermined number of pulses is counted, so that the lenses are returned to the original zooming position. At this point of time, the lens barrel motor 31 is stopped.

Figure 6:
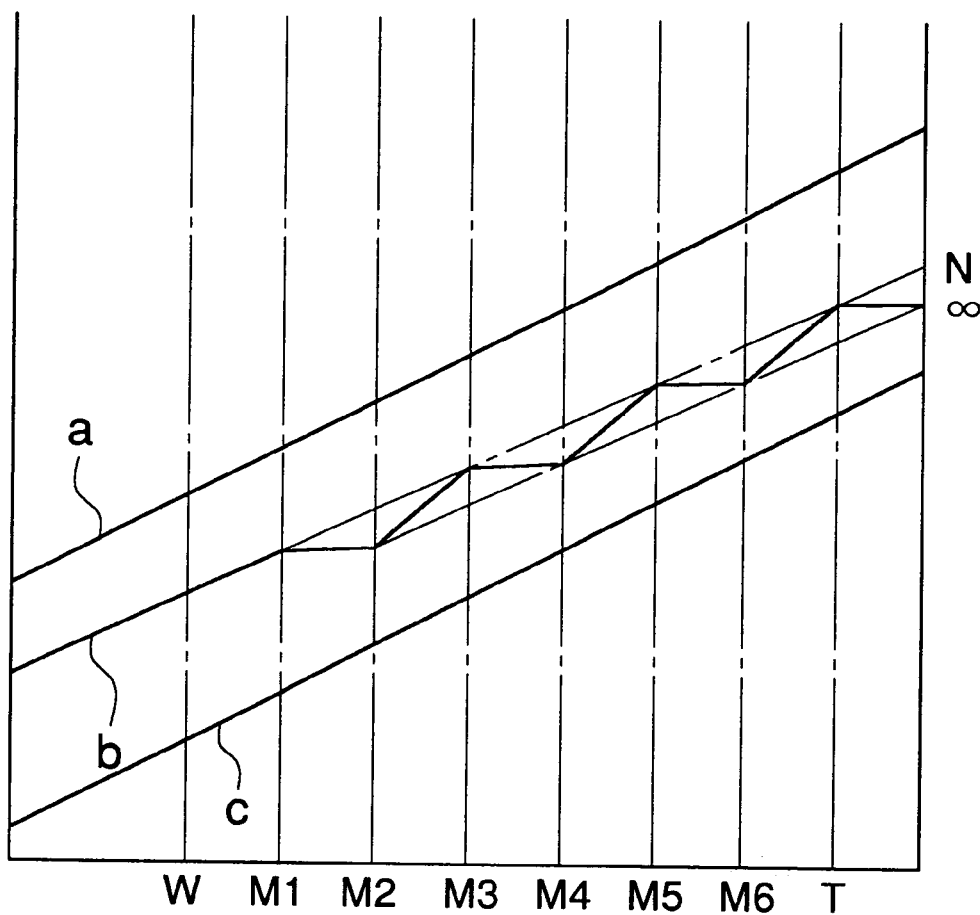
FIG. 6 is a zooming diagram of the embodiment.

Next, with reference to the zooming diagram of FIG. 6, the lens movement system will be explained as follows. FIG. 6 is a zooming diagram obtained from the zooming diagram described in Japanese Patent Application No. 235474/1994 applied by the present applicants.

This zooming diagram represents a step-zooming system in which a distance between the longest focal length and the shortest focal length is divided into a plurality of steps. In FIG. 6, the horizontal axis represents a change in the focal length. W represents a condition of the shortest focal length, and the focal length is successively increased in the order of M1, M2, M3, . . . , and T represents a condition in which the focal length is the longest. In this embodiment, as described above, the focal length can be changed over by 8 steps. The vertical axis represents a quantity of movement of the lens component conducted by the cam cylinder 2. In this diagram, line "a" represents the first lens component, and line "c" represents the third lens component. The first and the third lens component are linearly moved when the helicoid is rotated. In this diagram, line "b" represents the second lens component. By the action of the cam, the second lens component is approached to and separated from the first and the second lens component. These approaching and separating movements are alternatively repeated.

When the focusing operation is conducted under the condition of focal distance W, a lead angle of the helicoid for the first and the third lens component is the same as an inclination angle of the cam for the second lens component. Therefore, in accordance with the object distance, the first, the second and the third lens component are moved between W and M1. Since the side W does not contribute to the downsizing of the lens barrel in the optical axis direction, the first and the second lens component may be entirely moved in the optical axis direction. In this case, since the entire lens components are moved, the lens performance is not deteriorated, that is, the occurrence of aberration can be avoided. Next, the zooming operation is conducted by one step, and the entire lens components are moved to the position M1. When the focusing operation is conducted at the position M1, the entire lens components are moved in the optical axis direction between M1 and M2. However, a distance between the first and the third lens component is not changed, and a distance between the first and second lens component is changed and also a distance between the second and third lens component is changed. In order to downsize the lens barrel of the zoom lens, it is necessary to reduce the overall length of the lens barrel without deteriorating the focusing accuracy and the lens performance.

In order to reduce the overall length of the lens barrel, it is effective to reduce a quantity of lens movement necessary for focusing on the telescopic side. That is, on the side W, focusing is conducted when the first to the third lens component are integrally moved. After M1, a set of the first and the third lens component, and the second lens component are respectively moved by different distances. In this way, focusing is conducted. A quantity of movement of the entire lens barrel in the optical axis direction is the same as a quantity of movement of the set of the first and the third lens component. Accordingly, the quantity of movement of the entire lens barrel in the optical axis direction is smaller than that of the second system in which all the lens components are moved.

Compared with a quantity of movement of the front component lens in the case where focusing is conducted by protruding only the front component lens like the first system, a quantity of movement of the first and the third lens component, that is, a quantity of movement of the entire lens barrel in the optical axis direction is small, and further a quantity of movement of the second lens component necessary for focusing is not extremely short. Accordingly, it is possible to maintain a high lens stopping accuracy, and the focusing accuracy can be enhanced.

Further, when zooming is conducted by one step, the lens component moves to the position M2. Situations are the same from M2 to T. In this step zooming operation, zooming and focusing are conducted in the cam region between steps.

Accordingly, even if this zooming system is adopted to a zoom lens, the zoom ratio of which is high, the dimensions of the lens barrel are not increased.

According to the lens barrel of the prior art, zooming and focusing are respectively conducted by different mechanisms, however, according to the zoom lens barrel described before, zooming and focusing are conducted by the same mechanism. Therefore, it is possible to realize a very compact zoom lens barrel.

Figure 7:
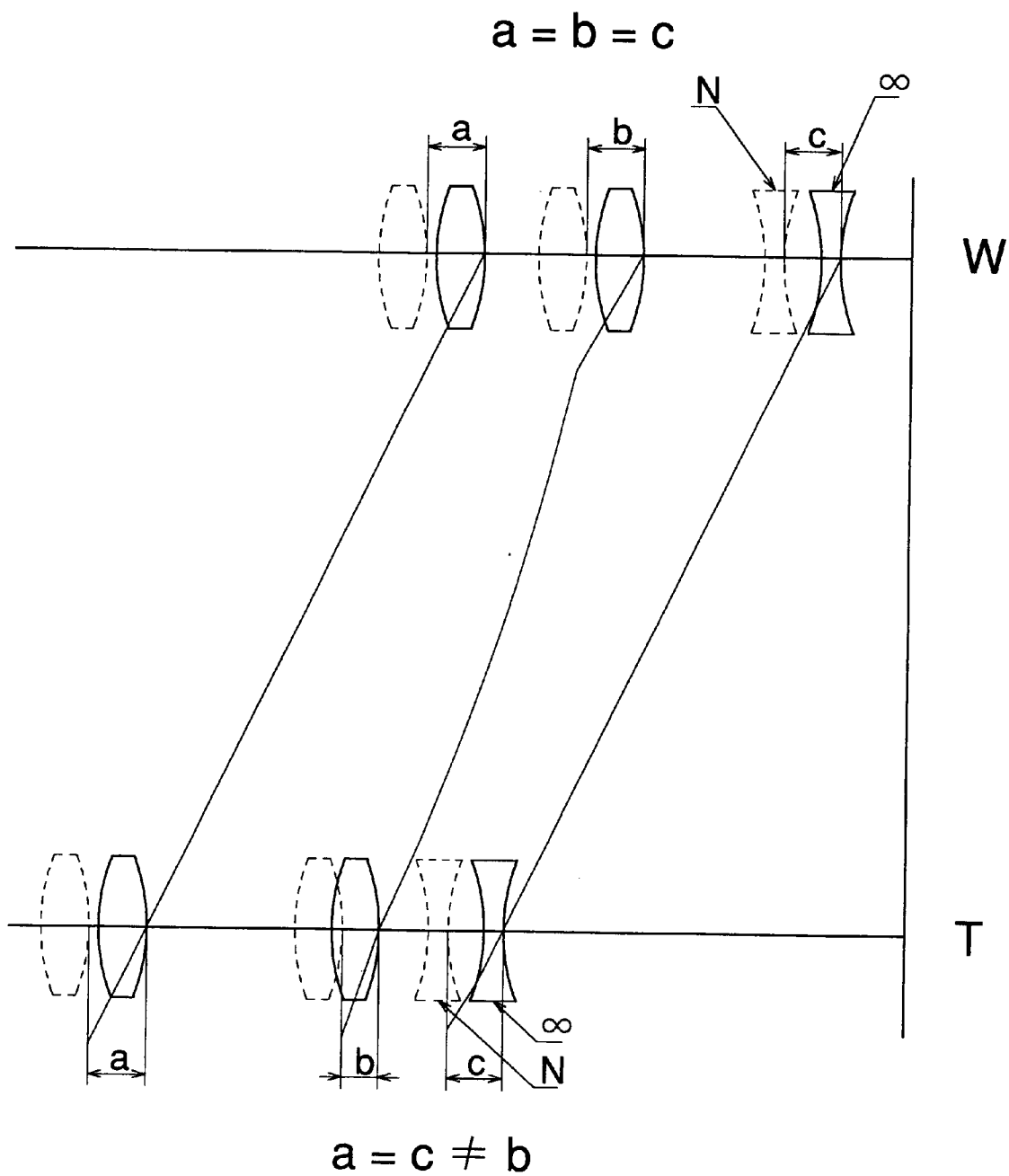
FIG. 7 is a diagram showing the movement of lens components in the case of zooming and focusing.

With reference to FIG. 7, quantities of lens movement of the first to the third lens component of this zoom lens barrel in the case of focusing will be explained as follows.

In FIG. 7, in the case of W (the shortest focal length), positions of the first to the third lens component, which are focused on an infinite photographic object, are shown by solid lines. Next, positions of the first to the third lens component, which are focused on a very close photographic object, are shown by broken lines. In this case, when focusing is conducted from the infinite to the very close position, quantities of movement of the first to the third lens component are represented by "a", "b" and "c". In this case, an inclination of the cam and an inclination of the helicoid are made to be the same so as to satisfy the equation of a=b=c.

However, in the case of T (the longest focal length), the inclination of the cam is different from the inclination of the helicoid, so that the equation of a=c≠b can be satisfied. That is, as shown in the lens movement diagram of FIG. 7, except for the case of W, a set of the first and the third lens component, and the second lens component are moved in a different way. Therefore, it is possible to provide a compact zoom lens barrel, the performance of which is not deteriorated.

As described above, according to the embodiment of the invention, three lens components are not moved by the same distance on the optical axis, but at least one of them is moved in a different manner from other two lens component, so as to conduct focusing.

That is, not only the condition of a=c≠b but also one of the following conditions should be satisfied.

a≠b and b≠c a=b≠c a≠b=c

When one of the following conditions is satisfied, it is possible to provide a variable focal distance lens characterized in that: focusing can be conducted when the lens unit is moved in the optical axis direction by a distance shorter than that of the conventional variable focal length lens; and the lens performance is not deteriorated, that is, the occurrence of aberration can be avoided.

In the zoom lens barrel of this embodiment, only when the shortest focal length is selected, the first to the third lens component are integrally moved on the optical axis, and after M1, a set of the first and the third lens component are integrally moved in one body, and the second lens component is moved separately. It is possible to select a different lens component movement pattern when necessary.

For example, the following system may be adopted. Only when the longest focal distance is selected, a set of the first and third lens component are integrally moved in one body, and the second lens component is moved separately from them. In other regions, that is, regions from the shortest focal distance to M6, the first to the third lens component are integrally moved in one body on the optical axis.

Further, when these are appropriately combined, the movement system of the first to the third lend group can be freely set at a predetermined focal length from the shortest to the longest focal length. In this connection, in the above zoom lens barrel, focusing and zooming are conducted by the same mechanism, and in order to prevent the deterioration of the lens performance on the short focal length side, all lens components are moved only on the short focal length side in the process of focusing, and the lens components are moved by different distances on the long focal length side. However, it should be noted that the present invention is limited to this specific embodiment. When all lens components are moved at least on the short focal length side, or when the lens components are moved by different distances on the long focal length side, it is possible to apply the embodiment to the conventional zoom lens barrel in which focusing and zooming are conducted by the different mechanisms.

It is also possible to adopt the embodiment to the above variable focal distance lens to which the step-zoom system is partially applied. For example, a plurality of lens components may be moved in the movement path as follows. Some lens components may be moved in the same movement path in the optical axis direction for the purpose of zooming and focusing, and other lens components may be moved in the different movement path for the purpose of zooming and focusing.

Another embodiment similar to the above embodiment will be explained as follows.

In this embodiment, the embodiment described above is partially used.

In the above embodiment, focusing is conducted as follows. On the short focal length side, three lens components are moved on the optical axis by the same distance, so that focusing can be conducted. On the long focal length side, a set of the first and the third lens component are moved on the optical axis by the same distance, and the second lens component is moved on the optical axis by a different distance, so that focusing can be conducted. However, it is possible to realize the following variation. When focusing is conducted by two lens components, on the short focal length side, the two lens components are moved on the optical axis by the same distance so that focusing can be conducted, and on the long distance side, the two lens components are moved on the optical axis by different distances so that focusing can be conducted.

With reference to the accompanying drawings, the above embodiment will be explained as follows. In this case, movements of the first and the second lens component or alternatively movements of the second and the third lens component illustrated in FIGS. 6 and 7 are picked up so as to be explained here.

In the variable focal length lens composed of two lens components described above, in the same manner as that of the above embodiment, it is possible to provide a variable focal distance lens characterized in that: focusing can be conducted when the lens unit is moved in the optical axis direction by a distance shorter than that of the conventional variable focal length lens; and the lens performance is not deteriorated, that is, the occurrence of aberration can be avoided.

Figure 8:
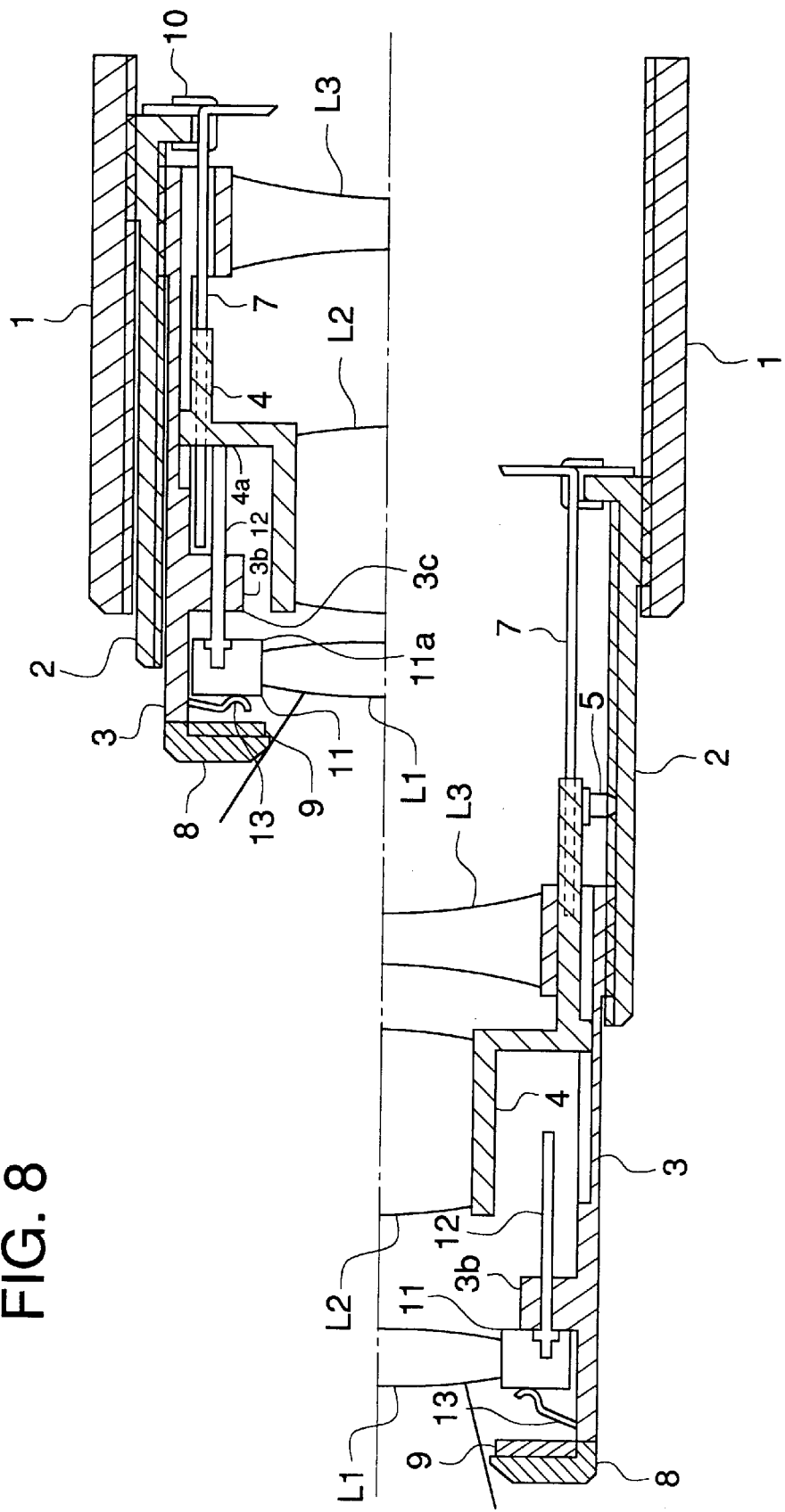
FIG. 8 is a cross-sectional view of the zoom lens barrel of another embodiment.

With reference to FIGS. 8 and 9, still another embodiment of the present invention will be explained in detail as follows.

FIG. 8 is a longitudinal sectional view of the zoom lens barrel similar to that shown in FIG. 3. Like parts in each of the drawings are identified by the same reference character. A greatly different point of FIG. 8 from FIG. 3 is that the inner cylinder 3 holds only the third lens component L3 and that the first lens holding frame 11 holds the first lens component L1. Three shafts 12 are attached to the first lens holding frame 11 in parallel with the optical axis. These three shafts 12 slidably penetrate the flange 3b on the inner circumference of the inner cylinder 3. Consequently, the first lens holding frame 11 is held by the inner cylinder 3 via the shafts 12. On the other hand, there is provided a leaf spring 13 in the front of the first lens holding frame 11, so that the first lens holding frame 11 is pushed backward.

An upper portion of FIG. 8 is a sectional view of the above zoom lens which is set in a short focal length condition. As shown in the drawing, an end portion of the shaft 12 attached to the first lens holding frame 11 pushed by the leaf spring 13 comes into contact with the side 4a of the second lens holding frame 4 moved by the action of a cam. As a result, the first lens holding frame 11 is pushed forward resisting the leaf spring 13. Since the length of the shaft 12 is constant, the first lens holding frame 11 and the second lens holding frame 4 are integrally moved in the optical axis direction. When zooming operation is conducted, the quantity of movement of the helicoid made by the inner cylinder 3 is larger than the quantity of movement of the cam made by the second holding frame 4. Then, the side 3c of the flange 3b on the inner circumference of the inner cylinder 3 comes into contact with the side 11a of the first lens holding frame 11, so that the first lens holding frame 11 is moved integrally with the inner cylinder 3.

That is, in the above embodiment, movements of the lens components are described as follows. In the case of a short focal length, the first lens component L1 is moved together with the second lens components L2. In the case of a long focal length, the first lens component L1 is moved together with the third lens components L3.

In the above zoom lens barrel, when an inclination of the cam caused by the second lens holding frame 4 and an inclination of the helicoid caused by the inner cylinder 3 are set at the same value in the case of short focal length, focusing can be conducted while a distance between the first and the third lens component, which determines the length of the lens barrel, is maintained constant.

In any conventional zoom lens barrels, a distance from the lens opening to the front lens component, which is the closest to the lens opening, is constant. Therefore, a quantity of unnecessary light, which is larger than a quantity of light incident on the wide angle side, is incident on the telescopic side. For this reason, photographic image quality is deteriorated. In order to solve the above problems, it is suggested to appropriately set the distance from the lens opening to the front lens component. However, for example, when the telescopic side is used as a reference side, a quantity of light on the wide angle side is not sufficient. Even when the opening is set so that an appropriate quantity of light can be provided at an intermediate position between the telescopic side and the wide angle side, an excessively large quantity of light is provided on the telescopic side, and an excessively small quantity of light is provided on the wide angle side. Therefore, the problems can not be solved fundamentally.

However, according to the present invention, it is possible to provide a zoom lens barrel, upon the front lens component of which a quantity of light appropriate for photographing is incident even if the zoom lens barrel is set on any of the wide angle side and the telescopic side.

Figure 9A:
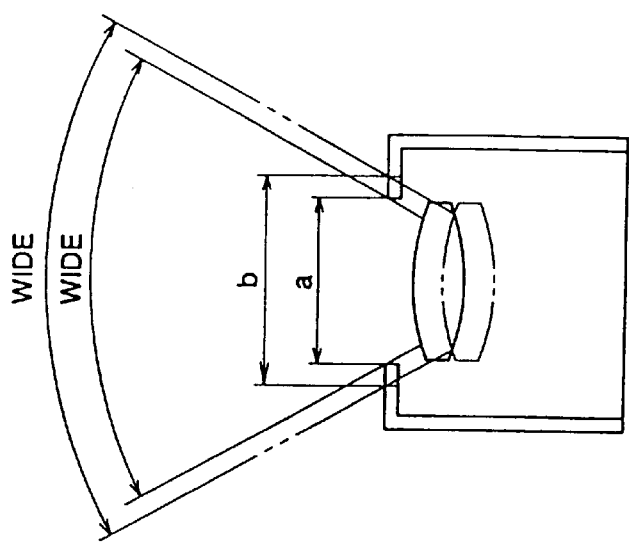
FIGS. 9(A) to 9(C) are schematic illustrations in which the hood effect provided by the embodiment is illustrated.
Figure 9B:
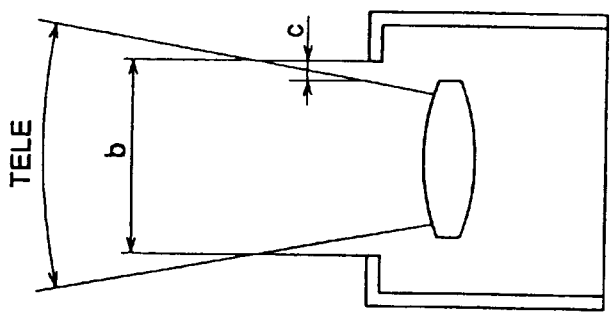
Figure 9C:
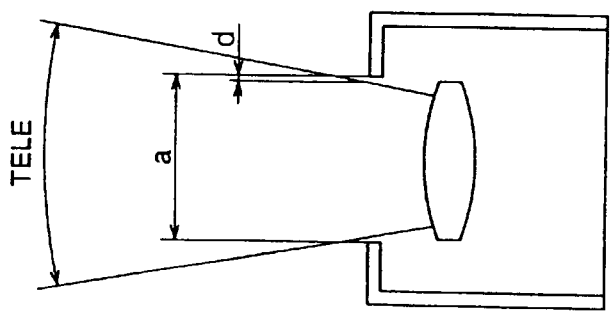

According to the present invention, it is possible to reduce the dimensions of the zoom lens barrel and further it is possible to provide a hood effect for preventing the entrance of unnecessary light. With reference to FIGS. 9(A) to 9(C), the above effects of the invention will be explained as follows.

FIG. 9(A) is a view showing a condition of the shortest focal length. In FIG. 9(A), a solid line expresses a case in which the first lens component is located on the photographic object side with respect to the lens barrel, and a two-dotted chain line expresses a case in which the first lens component is not located on the photographic object side with respect to the lens barrel. In FIG. 9(A), a difference between the opening sizes on the photographic object side in the above two cases is illustrated. In FIG. 9(A), "b" is an opening width in the case where the first lens component is not located on the photographic object side, and "a" is an opening width in the case where the first lens component is located on the photographic object side. In this case, the opening width "a" is smaller than the opening width "b". Accordingly, the inner diameter of the decorative frame 8 with respect to incident light may be small. As a result, the opening diameter of the barrier 9 may be small. Therefore, the barrier 9 needs only a small space for its operation. Accordingly, it is possible to downsize the lens barrel.

FIG. 9(B) is a view showing a lens barrel, the opening width of which is "b". A ray of incident light necessary for photographing in the case of the longest focal length is shown in FIG. 9(B). In FIG. 9(B), reference character "c" represents a range into which unnecessary rays of light or harmful rays of light can get.

FIG. 9(C) is a view showing a lens barrel, the opening width of which is "a". A ray of incident light necessary for photographing in the case of the longest focal length is shown in FIG. 9(C). In FIG. 9(C), reference character "d" represents a range into which unnecessary rays of light or harmful rays of light can get.

As can be seen in FIG. 9(C), since "b">"a", the inequality c>d is satisfied. The case illustrated in FIG. 9(C) is superior to the case illustrated in FIG. 9(B), because in the case illustrated in FIG. 9(C), it is difficult for unnecessary rays of light or harmful rays of light to get onto the lens surface. In the case of the longest focal length, the first lens component L1 is located at the rear, so that it is difficult for unnecessary rays of light to get onto the lens surface, and the hood effect can be provided.

As described above, movement of the first lens component in the optical axis direction is regulated by three shafts. Accordingly, the optical axis of the first lens component is difficult to be deformed with respect to the optical axis of the entire lens components. In other words, it is not necessary to provide a specific mechanism for "tilt-correction" or "shift-correction", and further, in the process of assembly, the lens components can be easily assembled into the lens barrel. Even when an external force, for example, an impact load is given to the entire lens components, the first lens component is not displaced from the movement path. For this reason, the optical axis is difficult to be deformed. Therefore, it is possible to provide a strong and inexpensive variable focal length lens, the optical axis accuracy of which is high.

According to the present invention, it is possible to provide a variable focal length lens characterized in that: focusing can be conducted when it moves in the optical axis direction by a distance shorter than that of the conventional variable focal length lens, and the lens performance is not deteriorated in the process of focusing, that is, the occurrence of aberration can be avoided. Accordingly, the length of the lens in the optical axis direction is short and the accuracy is not deteriorated when focusing is conducted. Therefore, it is possible to make the camera compact.

When the variable focal length lens of the invention is adopted, it is possible to reduce the number of lens components.

According to the invention, at least on the longest focal length side, the movement distance of the first and the third lens component in the optical axis direction is different from that of the second lens component. Accordingly, the protruding distance of the variable focal length lens necessary for focusing is shorter than that of the conventional lens. Therefore, the size of the lens in the optical axis direction can be greatly reduced.

At least on the shortest focal length side, since the first to the third lens component are moved by the same distance, the lens size can be reduced in the optical axis direction whole the occurrence of aberration of the lens is avoided.

Further, in the case of a lens component and a lens barrel of the step zoom type, the length of the variable focal length lens in the optical axis direction can be reduced without the deterioration of accuracy.

Further, at least on the shortest focal length side, the first and the second lens component are moved by the same distance. Accordingly, it is possible to provide a variable focal length lens, the lens performance of which is not deteriorated, that is, the occurrence of aberration can be avoided.

Further, at least on the longest focal distance side, the movement distance of the first lens component in the optical axis direction is different from that of the second lens component. Accordingly, it is possible to provide a hood effect by which incidence of unnecessary light can be avoided.

What is claimed is:

1. A lens unit for performing a photographing operation in response to a release switch being pushed, comprising:
   a plurality of lens components including
      a first lens component,
      a second lens component, and
      a third lens component,
      said first lens component, said second lens component, and said third lens component being aligned on an optical axis of said lens unit, said first lens component being closest of said plurality of lens components to an object, said second lens component being next to said first lens component, and said third lens component being next to said second lens component;
   moving means for moving said first lens component, said second lens component, and said third lens component along said optical axis; and
   shutter means operating in response to said release switch being pushed,
   wherein said moving means moves said first lens component, said second lens component, and said third lens component along optical axis to a first set of positions according to a desired focal length of said lens unit, and
   said moving means further moves said first lens component, said second lens component, and said third lens component along said optical axis from said first set of positions to a second set of positions according to a second set of positions according to an object distance in response to said release switch being pushed so as to perform said photographing operation so that a moving distance of one of said first lens component, said second lens component, and said third lens component is different from a moving distance of at least one of the other lens components, when said desired focal length is within a first predetermined range which is a range from a longest focal length to a predetermined focal length, and so that a moving distance of said first lens component, said second lens component, and said third lens component is equal, when said desired focal length is within a second predetermined range which is a range from a shortest focal length to said predetermined focal length.

2. The lens unit of claim 1, wherein said moving means moves said first lens component along said optical axis by a distance equal to a moving distance of said third lens component so as to perform said photographing operation, when said desired focal length is within a first predetermined range.

3. The lens unit of claim 1, wherein said first lens component includes restriction means for restricting a distance between said first lens component and said second lens component so that when said desired focal length of said lens unit is within said second predetermined range, said first lens component and said second lens component move together while said restriction means restricts the distance between said first lens component and said second lens component.

4. The lens unit of claim 1, wherein said moving means moves said first lens component, said second lens component and said third lens component so as to select said desired focal length stepwise.

5. The lens unit of claim 4, wherein said moving means moves stepwise said second lens component along said optical axis while changing a distance to said third lens component during selecting said desired focal length.

6. The lens unit of claim 1, wherein said moving means includes guide routes for guiding said first lens component, said second lens component, and said third lens component so that said first lens component, said second lens component, and said third lens component are moved along said guide routes by said moving means, each of said first lens component, said second lens component, and said third lens component being moved along a single guide route of said guide routes.

7. The lens unit of claim 6, wherein said moving means has a cam cylinder and at least one of said guide routes is a cam groove provided on said cam cylinder.

8. The lens unit of claim 1, wherein a moving distance of said second lens component is different from moving distances of said first lens component and said third lens component during said photographing operation.

9. The lens unit of claim 1, wherein said moving means moves said first lens component, said second lens component and said third lens component along said optical axis to said first set of positions in response to a focal length selecting switch being activated.

10. A lens unit for performing a photographing operation in response to a release switch being pushed, comprising:

a first lens component being closest to an object;

a second lens component being farther from the object than said first lens component, said first lens component and said second lens component being aligned on an optical axis of the lens unit;

moving means for moving said first lens component and said second lens component along said optical axis; and shutter means operating in response to said release switch being pushed;

wherein said moving means moves said first lens component and said second lens component along said optical axis to a first set of positions according to a desired focal length of said lens unit, and said moving means further moves said first lens component and said second lens component along said optical axis from said first set of positions to a second set of positions according to an object distance in response to said release switch being pushed so that a first moving distance of said first lens component is equal to a second moving distance of said second lens component when said desired focal length is within a range from a shortest focal length to a predetermined focal length, and so that said first moving distance and said second moving distance are different when said desired focal length is within a range from said predetermined focal length to a longest focal length.

11. The lens unit of claim 10, wherein said moving means moves said first lens component and said second lens component along said optical axis to said first set of positions in response to a focal length selecting switch being activated.

12. A camera comprising:

a plurality of lens components including
  a first lens component,
  a second lens component, and
  a third lens component,
  said first lens component, said second lens component, and said third lens component being aligned on an optical axis of said lens unit, said first lens component being closest of said plurality of lens components to an object, said second lens component being next to said first lens component, and said third lens component being next to said second lens component;

moving means for moving said first lens component, said second lens component, and said third lens component along said optical axis; and a release switch for initiating a photographing operation when the release switch is pushed; and shutter means operating in response to said release switch being pushed, wherein said moving means moves said first lens component, said second lens component, and said third lens component along said optical axis to a first set of positions according to a desired focal length of said lens unit, and said moving means further moves said first lens component, said second lens component, and said third lens component along said optical axis from said first set of positions to a second set of positions according to an object distance in response to said release switch being pushed so that a moving distance of one of said first lens component, said second lens component, and said third lens component is different from a moving distance of at least one of the other lens components, when said desired focal length is within a first predetermined range which is a range from a predetermined focal length to a longest focal length, and so that a moving distance of said first lens component, said second lens component, and said third lens component is equal, when said desired focal length is within a second predetermined range which is a range from a shortest focal length to said predetermined focal length.

13. The camera of claim 12, wherein said moving means moves said first lens component along said optical axis by a distance equal to a moving distance of said third lens component so as to perform said photographing operation.

14. The camera of claim 12, wherein said first lens component includes restriction means for restricting a distance between said first lens component and said second lens component so that when said desired focal length is within said second predetermined range, said first lens component and said second lens component move together while said restriction means restricts the distance between said first lens component and said second lens component.

15. A camera of claim 12, wherein said moving means moves said first lens component, said second lens component, and said third lens component so as to select said desired focal length stepwise.

16. The camera of claim 15, wherein said moving means moves stepwise said second lens component along said optical axis while changing a distance to said third lens component during selecting said desired focal length.

17. The camera of claim 12, wherein said moving means includes guide routes for guiding said first lens component, said second lens component, and said third lens component so that said first lens component, said second lens component, and said third lens component are moved along said guide routes by said moving means, each of said first lens component, said second lens component, and said third lens component being moved along a single guide route of said guide routes.

18. The camera of claim 17, wherein said moving means has a cam cylinder and at least one of said guide routes is a cam groove provided on said cam cylinder.

19. The camera of claim 12, wherein a moving distance of said second lens component is different from moving distances of said first lens component and said third lens component during said photographing operation.

20. The camera of claim 12, further comprising a focal length selecting switch, wherein said moving means moves said first lens component, said second lens component, and said third lens component along said optical axis to said first set of positions in response to said focal length selecting switch being activated.

21. A camera comprising:

a first lens component being closest to an object;

a second lens component being farther from the object than said first lens component, said first lens component and said second lens component being aligned on an optical axis of the lens unit;

moving means for moving said first lens component and said second lens component along said optical axis;

a release switch for initiating a photographing operation when the release switch is pushed; and shutter means operating in response to said release switch being pushed, wherein said moving means moves said first lens component and said second lens component along said optical axis to a first set of positions according to a desired focal length of said lens unit, and said moving means further moves said first lens component and said second lens component along said optical axis from said first set of positions to a second set of positions according to an object distance in response to said release switch being pushed so that a first moving distance of said first lens component is equal to a second moving distance of said second lens component when said desired focal length is within a range from a shortest focal length to a predetermined focal length, and so that said first moving distance and said second moving distance are different when said desired focal length is within a range from said predetermined focal length to a longest focal length.

22. The camera of claim 21, further comprising:

a focal length selecting switch, wherein said moving means moves said first lens component and said second lens component along said optical axis to said first set of positions in response to said focal length selecting switch being activated.

* * * * *